(12) United States Patent
Burr (10) Patent No.: US 11,074,499 B2
(45) Date of Patent: Jul. 27, 2021

(54) SYNAPTIC WEIGHT TRANSFER BETWEEN CONDUCTANCE PAIRS WITH POLARITY INVERSION FOR REDUCING FIXED DEVICE ASYMMETRIES

(71) Applicant: INTERNATIONAL BUSINESS MACHINES CORPORATION, Armonk, NY (US)

(72) Inventor: Geoffrey W Burr, Cupertino, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 916 days.

(21) Appl. No.: 15/818,521

(22) Filed: Nov. 20, 2017

(65) Prior Publication Data

US 2019/0156194 A1    May 23, 2019

(51) Int. Cl.
*G06N 3/08*    (2006.01)
*G06N 3/063*   (2006.01)

(52) U.S. Cl.
CPC ............ *G06N 3/08* (2013.01); *G06N 3/0635* (2013.01); *G06N 3/084* (2013.01)

(58) Field of Classification Search
CPC ....................................................... G06N 3/04
(Continued)

(56) References Cited

U.S. PATENT DOCUMENTS

| 7,814,038 B1 | 10/2010 | Repici |
| 8,655,813 B2 | 2/2014 | Ananthanarayanan et al. |

(Continued)

FOREIGN PATENT DOCUMENTS

| EP | 768610 | 4/1997 |
| WO | 2010133925 | 11/2010 |
| WO | 2013167780 | 11/2013 |

OTHER PUBLICATIONS

Castellani et al., "A model of bidirectional synaptic plasticity: from signaling network to channel conductance," Learning & Memory, V12, pp. 423-432.

(Continued)

*Primary Examiner* — David R Vincent
(74) *Attorney, Agent, or Firm* — Cantor Colburn LLP; Randall Bluestone (57) ABSTRACT

Artificial neural networks (ANNs) are a distributed computing model in which computation is accomplished with many simple processing units, called neurons, with data embodied by the connections between neurons, called synapses, and by the strength of these connections, the synaptic weights. An attractive implementation of ANNs uses the conductance of non-volatile memory (NVM) elements to record the synaptic weight, with the important multiply—accumulate step performed in place, at the data. In this application, the non-idealities in the response of the NVM such as nonlinearity, saturation, stochasticity and asymmetry in response to programming pulses lead to reduced network performance compared to an ideal network implementation. A method is shown that improves performance by periodically inverting the polarity of less-significant signed analog conductance-pairs within synaptic weights that are distributed across multiple conductances of varying significance, upon transfer of weight information between less-significant signed analog conductance-pairs to more-significant analog conductance-pairs.

5 Claims, 6 Drawing Sheets

(58) Field of Classification Search
USPC .................................................. 706/15, 45
See application file for complete search history.

(56) References Cited

U.S. PATENT DOCUMENTS

| | | |
|---|---|---|
| 8,676,734 B2 | 3/2014 | Aparin |
| 8,694,452 B2 | 4/2014 | Aparin et al. |
| 8,775,346 B2 | 7/2014 | Nishitani et al. |
| 8,811,060 B2 | 8/2014 | Burr et al. |
| 8,832,011 B2 | 9/2014 | Rajendran et al. |
| 9,092,736 B2 | 7/2015 | Aparin et al. |
| 9,424,514 B2 | 8/2016 | Weng et al. |
| 9,619,749 B2 | 4/2017 | Pescianschi |
| 9,715,656 B1 | 7/2017 | Gokmen |
| 2012/0330872 A1 | 12/2012 | Esser et al. |
| 2015/0019468 A1 | 1/2015 | Nugent et al. |
| 2015/0106316 A1 | 4/2015 | Barsimantov et al. |
| 2015/0178618 A1 | 6/2015 | Nogaret |
| 2015/0379396 A1 | 12/2015 | Arthur et al. |
| 2016/0267379 A1 | 9/2016 | Eleftheriou et al. |
| 2016/0364643 A1 | 12/2016 | Cruz-Albrecht et al. |
| 2017/0185889 A1 | 6/2017 | Hosokawa et al. |
| 2017/0193363 A1 | 7/2017 | Lee |
| 2019/0034788 A1* | 1/2019 | Burr ................. G06N 3/063 |

OTHER PUBLICATIONS

Burr et al., "Experimental demonstration and tolerancing of a large-scale neural network (165,00 synapse), using phase-change memory as the synaptic weight element," IEEE Transactions on Electron Devices, Nov. 2015, 62:11, pp. 3498-3507.

Suri et al., "Phase Change Memory as Synapse for Ultra-Dense Neuromorphic Systems: Application to Complex Visual Pattern Extraction," IEDM Technical Digest, 1988, Dec. 2011, 4:4, pp. 79-82.

Rumelhart et al., "Learning internal representations by error propagation," Parallel distributed processing: explorations in the microstructure of cognition, vol. 1, MIT Press Cambridge, 1986, pp. 318-362.

Mirhassani et al., "A Feed-Forward Time-Multiplexed Neural Network With Signal Neuron Synapse Arrays," Microelectronic Engineering, Feb. 2007, 84:2, pp. 300-307.

Westerman et al., "Neuromorphic-Synapses for Artificial Dendrites," Analog Integrated Circuits and Signal Processing, 1997, V13, pp. 167-184.

Burr et al., "Neuromorphic Computing Using Non-Volatile Memory," Advances in Physics:X, Sep. 13, 2017, 2:1, pp. 89-124.

Goldberg et al., "Probabilistic Synaptic Weighting in a Reconfigurable Network of VLSI Integrate-and-Fire Neurons," Neural Networks, Mar. 21, 2001, V14, pp. 781-793.

* cited by examiner

SYNAPTIC WEIGHT TRANSFER BETWEEN CONDUCTANCE PAIRS WITH POLARITY INVERSION FOR REDUCING FIXED DEVICE ASYMMETRIES

BACKGROUND OF THE INVENTION

Field of Invention

The present invention relates generally to the field of Artificial Neural Networks (ANNs). More specifically, the present invention is related to a system and method for constructing synaptic weights for artificial neural networks from signed analog conductance-pairs of varying significance, in which the polarity of lower-significance conductance-pairs is periodically inverted.

Discussion of Related Art

Artificial Neural Networks (ANNs) are distributed computing systems, which consist of a number of neurons interconnected through connection points called synapses. Each synapse encodes the strength of the connection between the output of one neuron and the input of another. The output of each neuron is determined by the aggregate input received from other neurons that are connected to it, and thus by the outputs of these "upstream" connected neurons and the strength of the connections as determined by the synaptic weights. The ANN is trained to solve a specific problem (e.g., pattern recognition) by adjusting the weights of the synapses such that a particular class of inputs produce a desired output. The weight adjustment procedure is known as "learning." There are many algorithms in the ANN literature for performing learning that are suitable for various tasks such as image recognition, speech recognition, language processing, etc. Ideally, these algorithms lead to a pattern of synaptic weights that, during the learning process, converges toward an optimal solution of the given problem.

Figure 1:
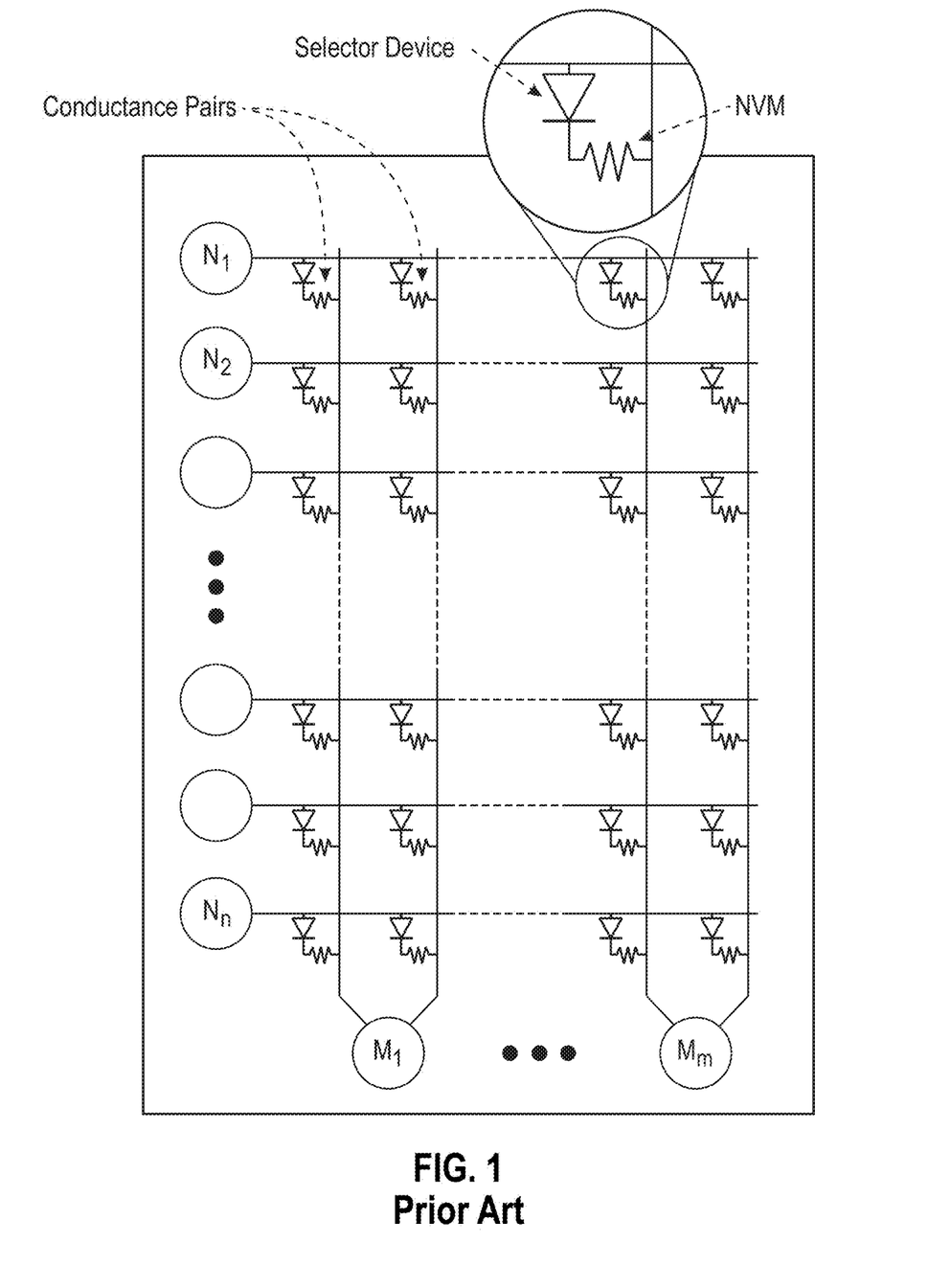
FIG. 1 illustrates a prior art array with one conductance-pair per synapse.

An attractive implementation of ANNs uses some (e.g., CMOS) circuitry to represent the neuron, the function of which is to integrate or sum the aggregate input from upstream neurons to which a particular neuron is connected, and apply some nonlinear function of the input to derive the output of that neuron. Because in general, each neuron is connected to some large fraction of the other neurons, the number of synapses (connections) is much larger than the number of neurons; thus it is advantageous to use some implementation of synapses that can achieve very high density on a neuromorphic computing chip. One attractive choice is some non-volatile memory (NVM) technology such as resistive random access memory (RRAM) or phase-change memory (PCM). Since both positive and negative (i.e., excitatory and inhibitory) weights are desired, one scheme uses a pair of NVM to represent the weight as the difference in conductance between the two (see M. Suri et al., "Phase Change Memory as Synapse for Ultra-Dense Neuromorphic Systems: Application to Complex Visual Pattern Extraction," *IEDM Technical Digest*, 4.4, 2011). This scheme is shown in FIG. 1. The outputs of the upstream $N_i$ neurons are summed in parallel through pairs of NVM conductances into the positive and negative inputs of the downstream $M_i$ neurons. This parallelism is highly advantageous for efficient computation.

During learning, the conductances of the NVM elements are programmed by sending them pulses that can either increase or decrease the conductance according to a learning rule. One common learning rule investigated is backpropagation (see Rumelhart et. al., "Learning Internal Representations by Error Propagation," Parallel Distributed Processing: Explorations in the Microstructure of Cognition, Vol 1, 1986), which is used extensively in deep learning networks that are currently being implemented on graphical processing units (GPU's) for image recognition, learning to play video games, etc. The backpropagation algorithm calls for a weight update $\Delta w_{ij} = \eta \cdot x_i \cdot \delta_j$ that is proportional to the product of the output of the upstream neuron, $x_i$, and the error contribution from the downstream neuron, $\delta_j$, with the proportionality constant, $\eta$ known as the learning rate. It was previously shown (see Burr et al., "Experimental demonstration and tolerancing of a large scale neural network (165,000 synapses), using phase-change memory as the synaptic weight element," IEDM Technical Digest, 2014) that this "crossbar-compatible" learning rule is just as effective as the conventional backpropagation rule.

Any real NVM element has a non-ideal response. It is nonlinear and has a limit to the maximum conductance it can achieve. The conductance change to a pulse designed to increase conductance is different from that to a pulse designed to decrease conductance, i.e., the response is asymmetric. There are variations among devices, some devices will be inoperable, either stuck in a high conductance state or stuck in a low conductance state.

Our work has shown that many of these defects cause very little decrease in ANN performance. However, nonlinearity, bounded conductance and asymmetric response cause a reduction in accuracy for the MNIST digit recognition problem from 99+% accuracy during training to something between 80% and 85%.

During training, many different inputs are presented to the network, and the backpropagation learning rule is used to update the NVM conductances after each (or after some small number of inputs, called a minibatch). Some weights in the network tend to evolve steadily toward some stable value, while others tend to dither up and down, sometimes increasing, other times decreasing. When the NVM response is nonlinear or asymmetric, the response to a pulse intended to decrease the weight value will be stronger than one intended to increase the weights. This tends to push many of these weights towards zero, making the backpropagation learning rule ineffective and decreasing network performance.

Prior art work is the introduction of signed synaptic weights based on two conductances. However, for some NVM devices such as phase-change memory (PCM), filament-based RRAM (such as using HfOx or TaOx), or Conductive-Bridging RAM based on metal-filaments, small conductance changes can be only implemented in one direction. As a direct result of this, a synaptic weight that is large in magnitude tends to be extremely fragile, responding well to steps in its smaller conductance (which decrease weight magnitude) but responding poorly to steps in its larger conductance (which increases weight magnitude). Thus, network performance degrades, because the weights that the network wants to make large have a difficult time staying large.

Embodiments of the present invention are an improvement over both prior art and prior invention systems and methods.

SUMMARY OF THE INVENTION

In one embodiment, the present invention provides a method to mitigate undesired contributions to weight induced by fixed device asymmetry in an artificial neural network (ANN), a synaptic weight of each synapse in the ANN being represented by a weighted current flow from multiple conductance-pairs, where a plurality of training examples are serially input to the ANN while observing its output, the method comprising: during a first transfer interval representing a first training cycle, transferring a portion of the synaptic weight from a conductance-pair of lower significance, (g-g$^{shared}$), to a conductance-pair of higher significance, (G$^+$-G$^-$); and during a second transfer interval after the first transfer interval and representing a second training cycle, transferring a portion of the synaptic weight from the conductance-pair of lower significance that is inverted in polarity, −(g-g$^{shared}$), to a conductance-pair of higher significance, (G$^+$-G$^-$), wherein fixed device asymmetry in this ANN cancels out across a plurality of such first and second transfer intervals.

In another embodiment, the present invention provides a method implemented in an artificial neural network (ANN), the ANN comprising a plurality of neurons arranged in layers with the outputs of one layer connected to the inputs of a plurality of the neurons of a subsequent layer, where neurons are connected to each other via a plurality of synapses, each of the synapses having a synaptic weight encoding a connection strength between two connected neurons, the magnitude of the synaptic weight of each synapse being represented by a weighted current flow from multiple conductance-pairs, where a plurality of training examples are serially input to the ANN while observing its output, where a backpropagation algorithm updates the synaptic weight in response to the difference between the output from a given layer and a desired output from the given layer, the method comprising: (a) periodically transferring a portion of the synaptic weight from a conductance-pair of lower significance to a conductance-pair of higher significance, such that the total synaptic weight remains substantially unchanged; (b) upon one or more of these periodic transfers of synaptic weight, inverting the polarity of the conductance-pair of lower significance; and (c) repeating the serial input of the training examples until the network output approaches the desired output within a predetermined accuracy.

In yet another embodiment, the present invention provides a method implemented in an artificial neural network (ANN), the ANN comprising a plurality of neurons arranged in layers with the outputs of one layer connected to the inputs of a plurality of the neurons of a subsequent layer, where neurons are connected to each other via a plurality of synapses, each of the synapses having a synaptic weight encoding a connection strength between two connected neurons, the magnitude of the weight of each of the synapses represented by a weighted current flow from multiple conductance pairs, each of the multiple conductance pairs representing a joint contribution and having a higher-significance conductance-pair and a lower-significance conductance-pair, where a plurality of training examples are serially input to the ANN while observing its output, where a backpropagation algorithm updates the synaptic weight in response to a difference between the output from a given layer and a desired output from the given layer, the method comprising: (a) pausing training and measuring conductances across analog memory elements in the ANN network, and computing an original synaptic weight for each synapse by arithmetic contributions from two or more conductance pairs; (b) identifying at least one measured conductance in a given conductance pair whose absolute value greater than its paired conductance by a predetermined amount; (c) reconfiguring the lower-significance conductance pairs to be substantially equal, corresponding to a zero joint contribution towards an overall synaptic weight, and reconfiguring one of the more-significant conductance pairs until said original synaptic weight value is obtained; and (d) inverting the polarity of the conductance-pair of lower significance for subsequent training operations.

In another embodiment, the present invention provides a method implemented in an artificial neural network (ANN), the ANN comprising a plurality of neurons arranged in layers with the outputs of one layer connected to the inputs of a plurality of the neurons of a subsequent layer, where neurons are connected to each other via a plurality of synapses, each of the synapses having a synaptic weight encoding a connection strength between two connected neurons, the magnitude of the weight of each of the synapses represented by a weight current flow from multiple conductance pairs, each of the multiple conductance pairs representing a joint contribution and having a higher-significance conductance-pair and a lower-significance conductance-pair, where a plurality of training examples are serially input to the ANN while observing its output, where a backpropagation algorithm updates the synaptic weight in response to a difference between the output from a given layer and a desired output from the given layer, the method comprising: (a) pausing training and measuring conductances across analog memory elements in the ANN network, and computing an original synaptic weight for each synapse by arithmetic contributions from two or more conductance pairs; (b) identifying at least one measured conductance in a given conductance pair whose absolute value greater than its paired conductance by a predetermined amount; (c) reconfiguring the lower-significance conductance pairs to be substantially equal, corresponding to a zero joint contribution towards an overall synaptic weight, and reconfiguring one of the more-significant conductance pairs until said original synaptic weight value is obtained; and (d) inverting the polarity of the conductance-pair of lower significance for subsequent training operations, and wherein some of the synaptic weights in the ANN are implemented using a capacitor tied to the gate of a read transistor, together with programming transistors for adding charge to and subtracting charge from the capacitor according to signals associated with the downstream and upstream neurons.

BRIEF DESCRIPTION OF THE DRAWINGS

The present disclosure, in accordance with one or more various examples, is described in detail with reference to the following figures. The drawings are provided for purposes of illustration only and merely depict examples of the disclosure. These drawings are provided to facilitate the reader's understanding of the disclosure and should not be considered limiting of the breadth, scope, or applicability of the disclosure. It should be noted that for clarity and ease of illustration these drawings are not necessarily made to scale.

DESCRIPTION OF THE PREFERRED EMBODIMENTS

While this invention is illustrated and described in a preferred embodiment, the invention may be produced in many different configurations. There is depicted in the drawings, and will herein be described in detail, a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the present invention.

The invention described here builds upon an earlier disclosure of a technique for mitigating the effects of non-linearity and asymmetry in conductance response by distributing the synaptic weight across multiple pairs of conductances, each of varying significance. Each pair contributes in the usual way towards synaptic weight through the difference between an excitatory conductance, G+, and an inhibitory conductance, G−. However, the contribution of each pair varies in the amplification factor implemented at the end of the bit lines where these pairs are summed. Example-by-example programming can be implemented in many ways—in one manifestation, the least-significant conductance pair is updated during network training. Since much of the weight value is typically contained in the more-significant conductance pair, one or more of the less-significant conductance pairs could be comprised of volatile analog memory elements, such as a capacitor tied to the gate of a read transistor. In this case, adding or subtracting charge to the capacitor changes the gate voltage of the read transistor and thus its effective conductance. In the case of conductance values that are fully bidirectional and thus capable of being programmed both up and down in conductance, one of the conductances in each conductance pair could be shared across many different synapses, with all individual synaptic programming taking place by adjusting the non-shared conductance.

Figure 2:
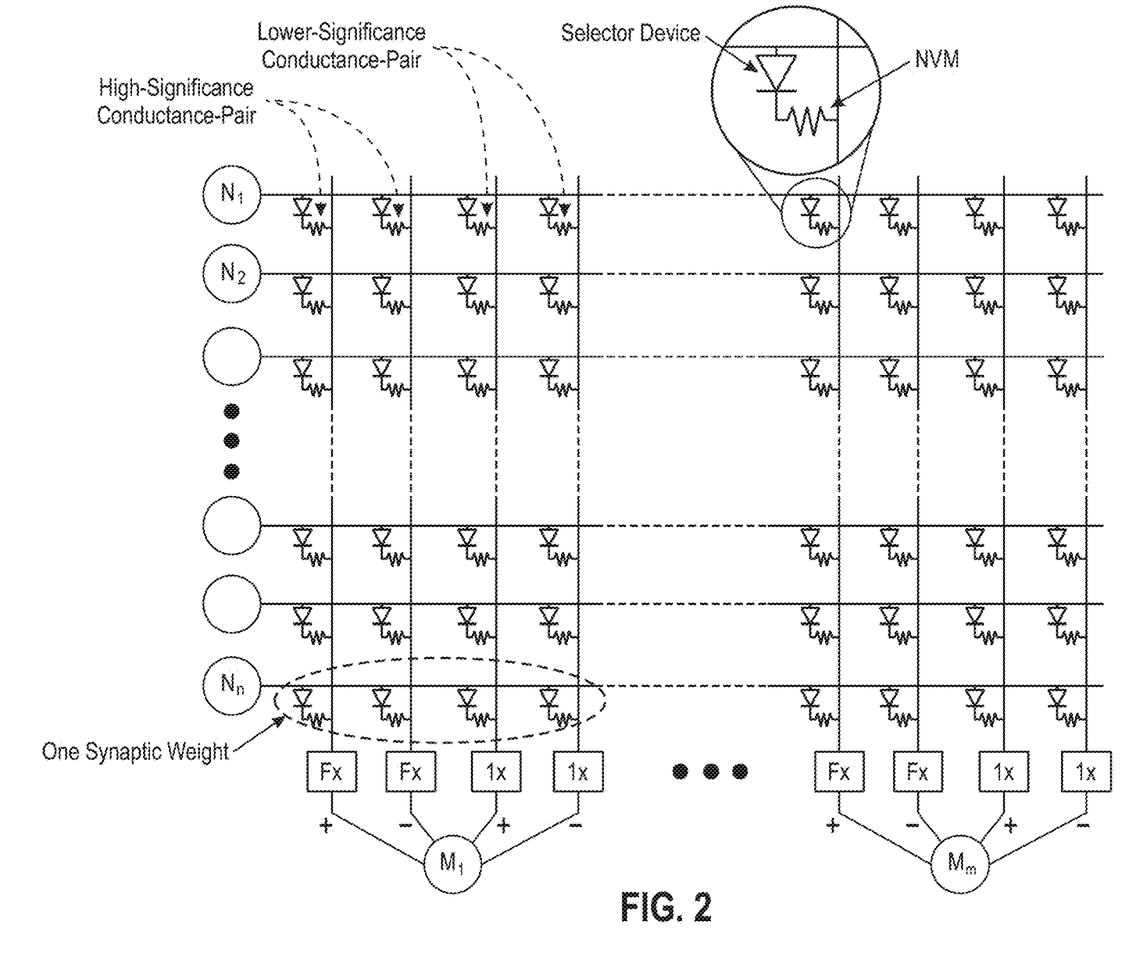
FIG. 2 depicts an array having more than one conductance-pair per synapse, with one set of pairs having its read-current amplified with respect to the other by a factor of F.

In Applicant's previous invention (USPTO Ser. No. 15/660,945), a method was introduced that improves performance by distributing the synaptic weight across multiple conductances of varying significance, implementing weight transfer from less-significant signed analog conductance-pairs to more-significant analog conductance-pairs. FIG. 2 shows the previously disclosed array (i.e., disclosed in USPTO Ser. No. 15/660,945) having more than one conductance-pair per synapse, with one set of pairs having its read-current amplified with respect to the other by a factor of F. In this figure, each synaptic weight is comprised of two pairs of conductances. The first pair contributes to the summed current of its downstream neuron at the bottom of the array with a gain factor of F with respect to the second pair. This implies that a large conductance difference in the second pair has the same contribution to the overall synaptic weight as a small conductance difference in the first pair. Thus, this technique increases the total dynamic range of the overall synapse, and allows a fast but volatile analog memory element exhibiting more linear and symmetric conductance change to be used as the second or lower-significance conductance pair for ANN example-by-example programming, with the accumulated synaptic weight change occasionally transferred carefully into the first conductance pair. Note that this is NOT a direct match to more or less significant bits of a digital word, since here there are multiple analog configurations of the multiple conductances that represent exactly the same overall synaptic weight. Similarly, the transfer operation from lower to higher significance conductance pair is not the same as a digital "carry" operation in a digital adder, and can be delayed as needed because of the redundancy in mapping of analog configurations to overall synaptic weight. Although the figure shows two conductance pairs, extension to three or more pairs is possible.

When a large synaptic weight has been developed, then this information is transferred from the large conductance difference in the less-significant conductance pair to a smaller (and thus more easily maintained) conductance difference in the next more-significant conductance pair. Since the more-significant conductance pairs are updated less frequently, this large synaptic weight is now better protected from being lost through the nonlinearities and asymmetries of the conductance, yet the network can still decrease this weight should it choose to do so. To a certain extent, the network has "banked" this weight into the conductance-pairs of higher significance.

However, it is still quite important that the weight update of the lower-significance pair be as symmetric as possible, so that the network can request many weight increases, and almost but not quite as many weight decreases, and have these opposite-sign contributions cancel correctly. There are two main sources of asymmetry: nonlinearity in the conductance response (typically a steep response that then saturates) and fixed device asymmetries (one device is simply always stronger or more effective in changing conductance than the other paired conductance).

One option for a more linear conductance update is to use a CMOS-based volatile conductance: a transistor with its gate tied to a capacitor. Charge can be added and subtracted to the capacitor in a quite linear way, using a pair of transistors. However, inherent CMOS fabrication variabilities will cause each transistor on a wafer—including both members of this pair of charge/discharge transistors—to vary in threshold voltage, and thus in the amount of charge they add or subtract to their capacitor. This can re-introduce a strong fixed asymmetry between the size of a conductance increase and the size of a conductance decrease. Similarly, Phase-Change Memory (PCM) or other types of Non-Volatile Memory (NVM) devices can also exhibit fixed asymmetries due to differences in the maximum saturated conductance that repeated application of a given partial-SET pulse will induce.

Thus, there is a need in the art for techniques to suppress conductance-update asymmetries introduced by fixed device asymmetry.

During training when using the "multiple conductances of varying significance," only the lower-significance conductance, g, (with respect to its reference current from $g^{shared}$)

is updated until a weight transfer occurs. In a chip implementation, transfer would be performed one column at a time. Before starting the weight transfer, the current weight of the entire column of devices is $F\times(G^+-G^-)+(g-g^{shared})$ where F is a small gain-factor around 2-5. This current weight value would be recorded in the peripheral circuitry (for the whole column), after which both g and $g^{shared}$ would be reset to their initial conditions, thus changing the weight stored on the array. The variability and nonlinear response of the nonvolatile higher-significance conductance-pair ($G^+$-$G^-$), implemented for instance with PCM) can be compensated by closed-loop weight tuning to return the weight stored on the array back to the desired target value (by comparison to the value preserved temporarily in the peripheral circuitry).

Once the weight information has been transferred from the g-$g^{shared}$ conductance pair to the $G^+$-$G^-$ PCM pair, any remaining weight-tuning error can be accommodated by programming the g conductance until the total weight again matches the value that was originally recorded in the peripheral circuitry. At this point, the current weight values that were temporarily retained in the peripheral circuitry are discarded.

Figure 3:
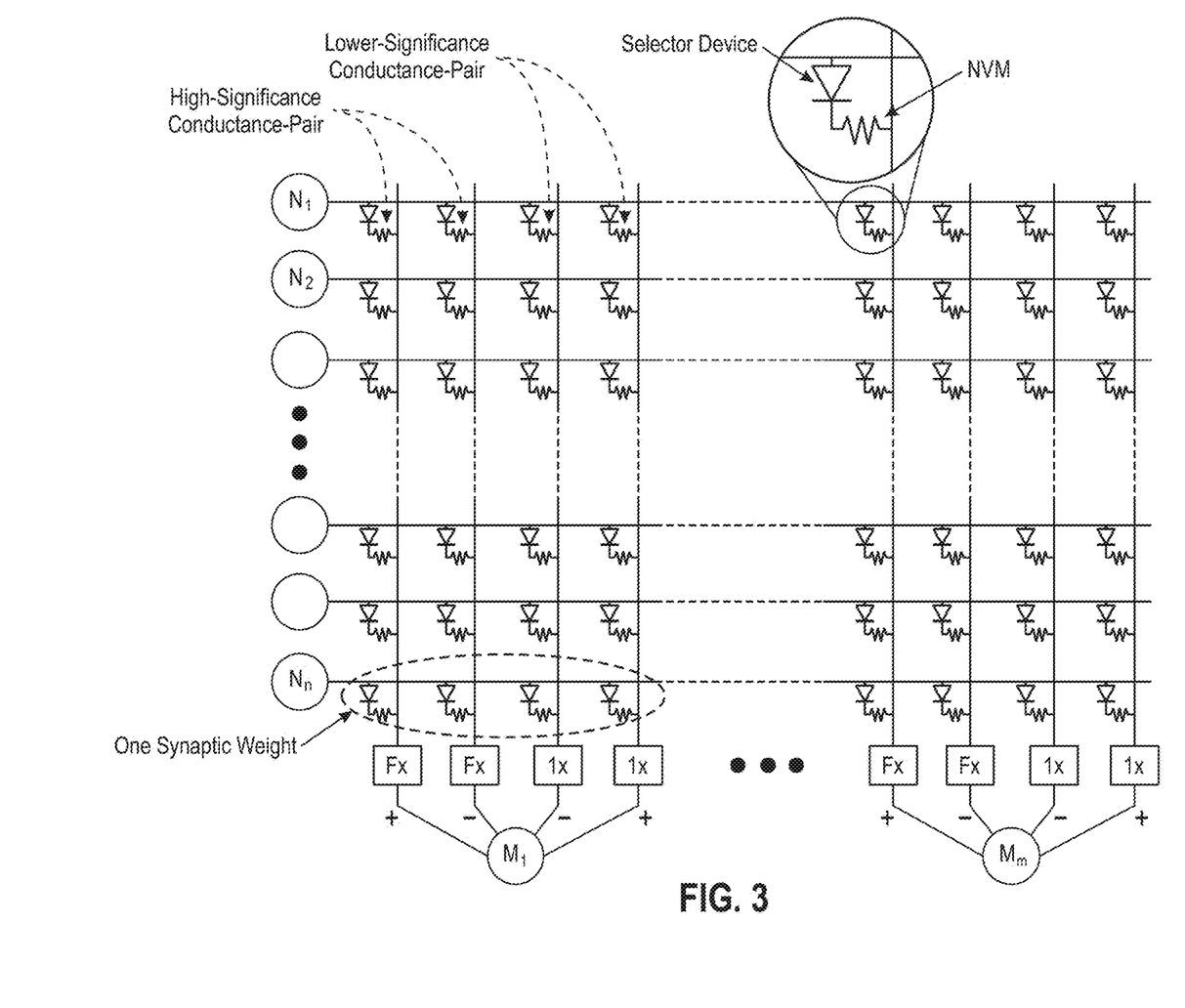
FIG. 3 depicts an array having more than one conductance-pair per synapse, with one set of pairs having its read-current amplified with respect to the other by a factor of F, in which the polarity of the lower-significance pairs has been inverted.

However, a problem remains in a 3T1C device (see, for example, FIG. 6 of USPTO Ser. No. 15/660,945) whose PFET is more effective than its NFET where weight increases may be reported after every single transfer interval because of this fixed asymmetry. Since all the weight was transferred from the g-$g^{shared}$ conductance pair, the effective polarity of this conductance pair is inverted during the next transfer interval. FIG. 3 depicts an array having more than one conductance-pair per synapse, with one set of pairs having its read-current amplified with respect to the other by a factor of F, in which the polarity of the lower-significance pairs has been inverted. This implies using the equation $F\times(G^+-G^-)-(g-g^{shared})$ while reading device currents (for both forward-inference and back-propagation), using the PFET to add charge when decreasing the weight, and using the NFET to subtract charge when increasing the weight. Polarity inversion must occur at the instant that g and $g^{shared}$ are reset to the same voltage, and before starting to correct any residual weight-tuning errors in the value of $G^+$-$G^-$ by adjusting the value of g. This adjustment to g must be performed with the NEW value of polarity that will be used for this device for all interactions all the way until the next weight-transfer operation on this device. There are additional complications introduced by the sharing of the reference device, but these can be accommodated as well.

Figure 4:
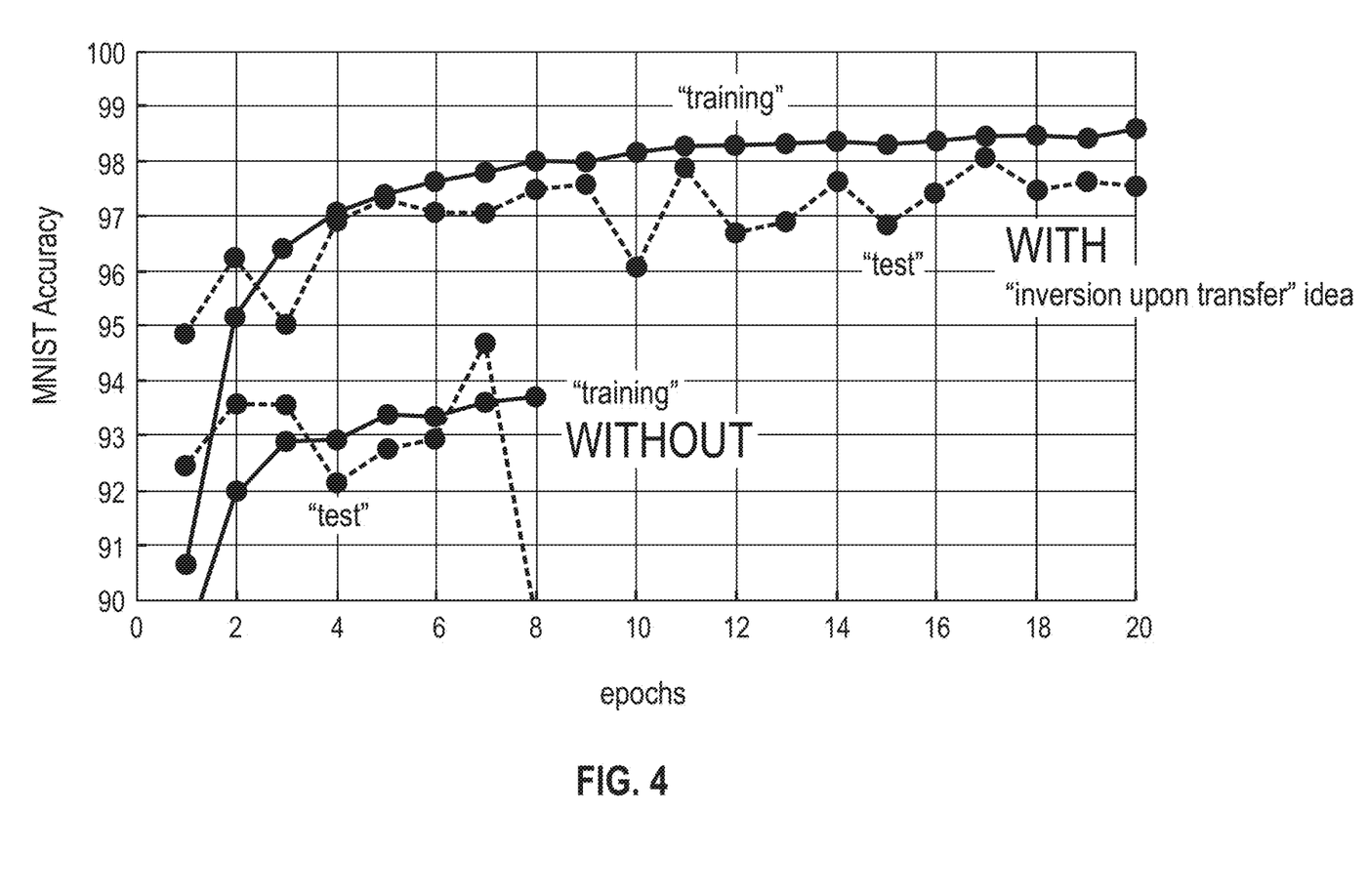
FIG. 4 depicts simulation results showing benefits of the technique of periodically inverting the polarity of a lower-significance conductance pair.

After each transfer interval, the polarity used for g-$g^{shared}$ is inverted during the subsequent training cycle. As a result, the undesired contributions to the weight induced by fixed device asymmetry tend to cancel out across multiple transfer intervals. FIG. 4 shows that this polarity inversion technique (the solid and dotted line graphs on top that extend to 20 epochs) markedly improves performance under simulation conditions that include the expected variabilities of CMOS transistors as modeled by SPICE circuit simulations. Without polarity inversion, the fixed asymmetry between charge addition and subtraction due to the unmatched CMOS devices degrades training accuracy noticeably. Yet by inverting the polarity upon each weight-transfer operation, training accuracy is high, matching the expectations of pure software-based training despite the presence of highly imperfect devices.

The polarity bit must be stored at the ends of the columns of the array, so that the downstream neuron knows how to control which currents are combined on forward inference, which devices are activated for reverse read, and which of the two transistors is activated to add/subtract charge to the capacitor. Thus, the transfer operation must be performed on a column-by-column basis, with this polarity bit at the end of the column (either south-side or north-side) being inverted to record the current polarity inversion for that column going forward.

Figure 5:
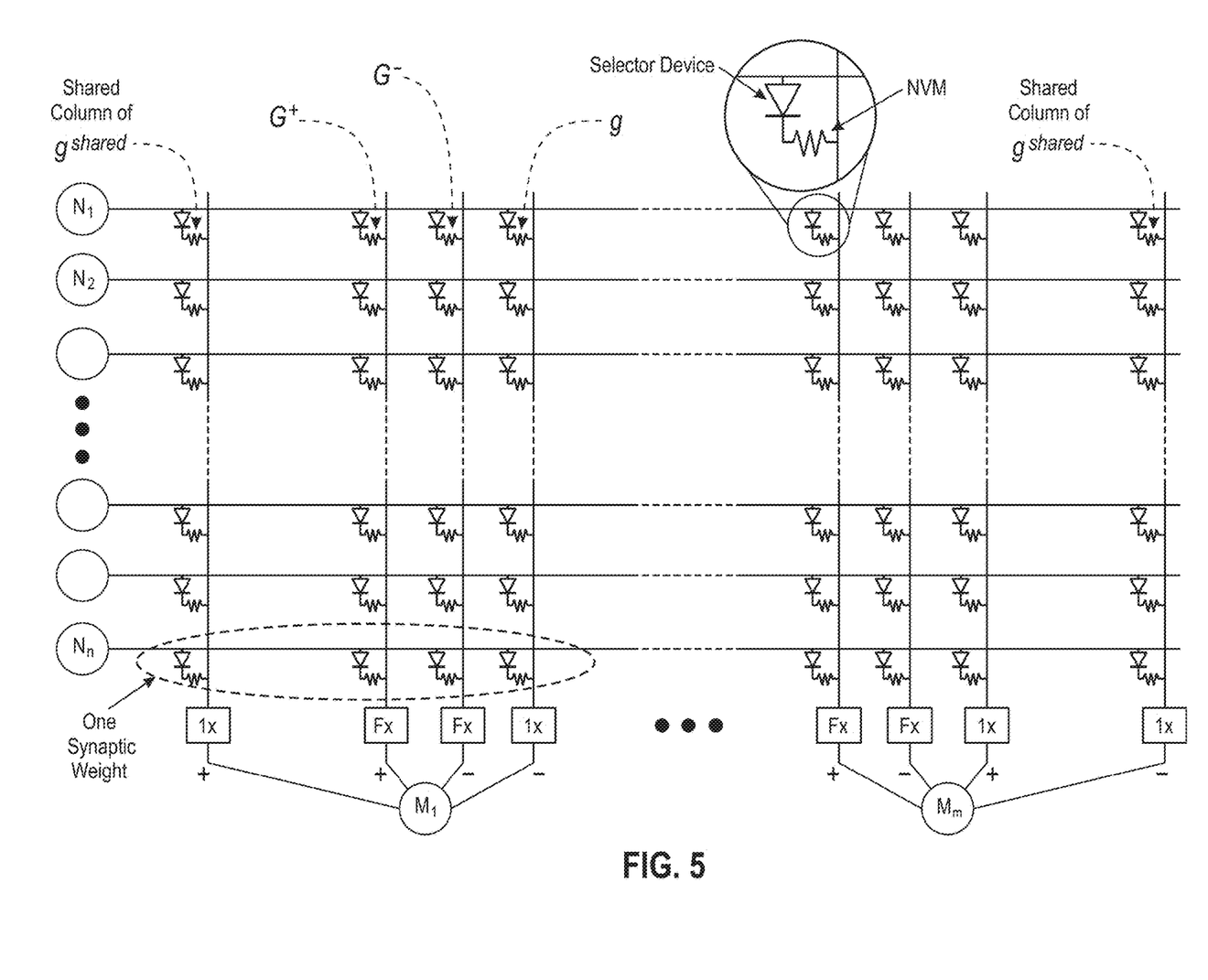
FIG. 5 shows a situation immediately after transfer of synapses in the same column as neuron $M_1$, which is sharing to the left and has just had the polarity of its g value inverted (g subtracts from the net weight), while neuron $M_m$ continues to have its g value add to the net weight, and shares to a $g^{shared}$ device located to its right.
Figure 6:
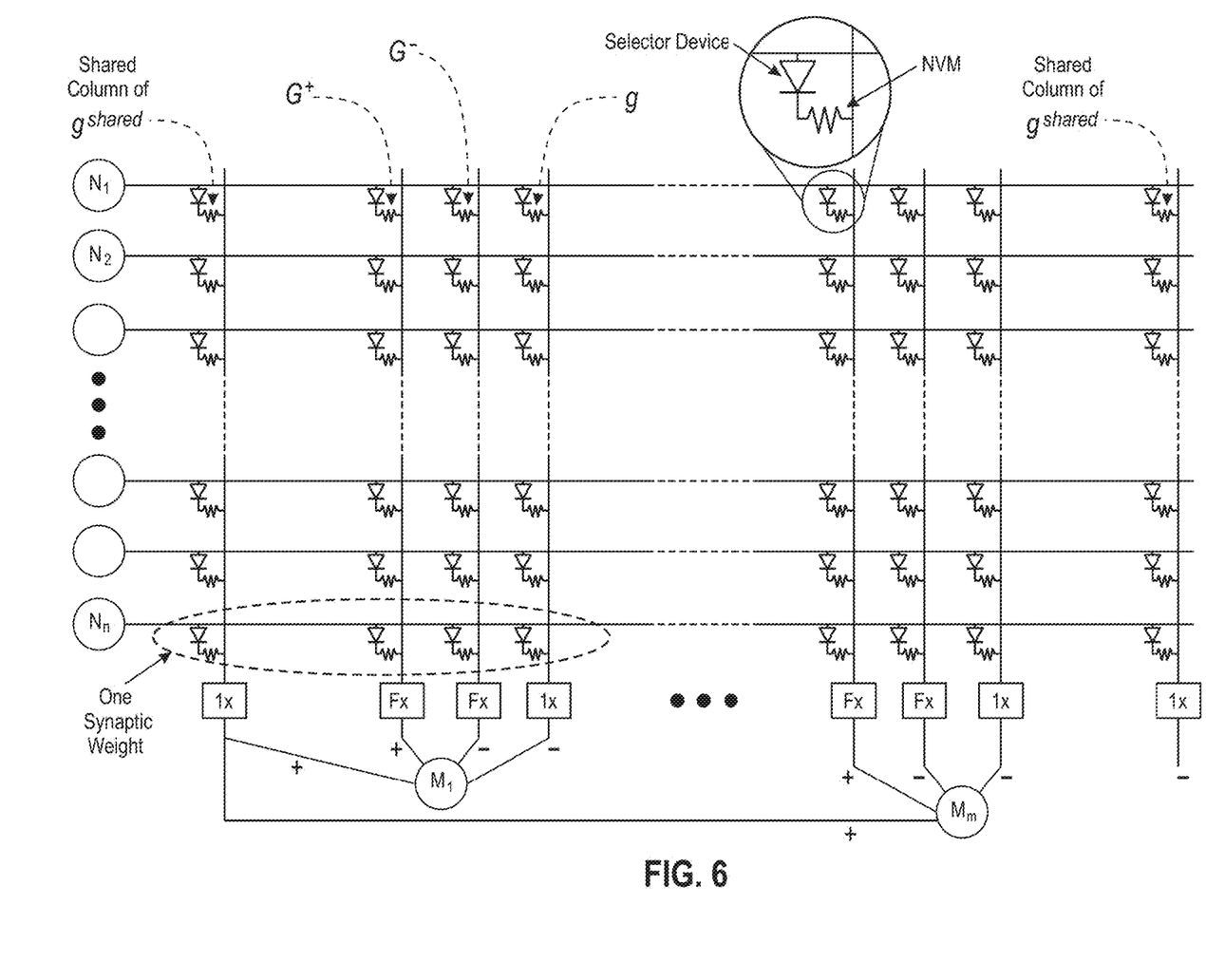
FIG. 6 shows a situation after transfer of column $M_m$, with its g value now also inverted, and the shared bias read current from the $g^{shared}$ device now being delivered from the shared device to the left which was recently reset to its initial value (at the same instant it gained its first shared column).

Thus, the only additional details are how to finesse $g^{shared}$. One approach is to use the polarity bit to signal whether the column-neuron should compare the incoming current from g against the shared device to the left (lower column number) or to the right (higher column number). The idea is that at the same instant that a column chooses to invert its polarity in how it interacts with its dedicated column of g devices, it ALSO starts sharing with a $g^{shared}$ device that has ALREADY been recently reset to its initial condition. This implies that when moving from left-to-right in addressing columns for transfer, the inversion of the polarity bit should change from having previously shared to the right to now sharing to the left. This also implies that the next column-wise sweep of transfer events across the array must now take place in the OPPOSITE direction, from right-to-left, swapping the polarity bit back to the original value while simultaneously inducing a change FROM "sharing to the left" TO now "sharing to the right." FIG. 5 shows the situation immediately after transfer of synapses in the same column as neuron $M_1$, which is sharing to the left and has just had the polarity of its g value inverted (g subtracts from the net weight). Meanwhile, neuron $M_m$ continues to have its g value add to the net weight, and shares to a $g^{shared}$ device located to its right. FIG. 6 shows the situation after transfer of column $M_m$, with its g value now also inverted, and the shared bias read current from the $g^{shared}$ device now being delivered from the shared device to the left which was recently reset to its initial value (at the same instant it gained its first shared column).

To avoid doing two successive transfers on the same column (e.g., as a left-to-right sweep is finished, followed by an immediate sweep of the same device from right-to-left), there can be a quadrant- or section-based approach. Here some set of, say, 32 columns is swept, left-to-right, from columns 1 to 32, inverting from positive to negative polarity. Then the next sweep is right-to-left, from columns 64 down to 33, now inverting from the original NEGATIVE polarity back to positive polarity. Later, one can sweep from 32 down to 1 and then from 33 up to 64, thus returning the sections to the same polarity they had at the beginning. Various combinations of section-size and number of sections can be used to try to make the length of each transfer interval as equal as possible.

In one embodiment, the present invention provides a method to mitigate undesired contributions to weight induced by fixed device asymmetry in an artificial neural network (ANN), a synaptic weight of each synapse in the ANN being represented by a weighted current flow from multiple conductance-pairs, where a plurality of training examples are serially input to the ANN while observing its output, the method comprising: during a first transfer interval representing a first training cycle, transferring a portion of the synaptic weight from a conductance-pair of lower significance, (g-$g^{shared}$), to a conductance-pair of higher significance, ($G^+$-$G^-$); during a second transfer interval after the first transfer interval and representing a second training cycle, transferring a portion of the synaptic weight from the conductance-pair of lower significance that is inverted in polarity, $-(g-g^{shared})$, to a conductance-pair of higher significance, $(G^+-G^-)$, and wherein fixed device asymmetry in this ANN cancels out across a plurality of such first and second transfer intervals.

In another embodiment, the present invention provides a method implemented in an artificial neural network (ANN), the ANN comprising a plurality of neurons arranged in layers with the outputs of one layer connected to the inputs of a plurality of the neurons of a subsequent layer, where neurons are connected to each other via a plurality of synapses, each of the synapses having a synaptic weight encoding a connection strength between two connected neurons, the magnitude of the synaptic weight of each synapse being represented by a weighted current flow from multiple conductance-pairs, where a plurality of training examples are serially input to the ANN while observing its output, where a backpropagation algorithm updates the synaptic weight in response to the difference between the output from a given layer and a desired output from the given layer, the method comprising: (a) periodically transferring a portion of the synaptic weight from a conductance-pair of lower significance to a conductance-pair of higher significance such that the total synaptic weight remains substantially unchanged; (b) upon one or more of these periodic transfers of synaptic weight, inverting the polarity of the conductance-pair of lower significance; and (c) repeating the serial input of the training examples until the network output approaches the desired output within a predetermined accuracy.

In yet another embodiment, the present invention provides a method implemented in an artificial neural network (ANN), the ANN comprising a plurality of neurons arranged in layers with the outputs of one layer connected to the inputs of a plurality of the neurons of a subsequent layer, where neurons are connected to each other via a plurality of synapses, each of the synapses having a synaptic weight encoding a connection strength between two connected neurons, the magnitude of the weight of each of the synapses represented by a weighted current flow from multiple conductance pairs, each of the multiple conductance pairs representing a joint contribution and having a higher-significance conductance-pair and a lower-significance conductance-pair, where a plurality of training examples are serially input to the ANN while observing its output from the given layer, the method comprising: (a) pausing training and measuring conductances across analog memory elements in the ANN network, and computing an original synaptic weight for each synapse by arithmetic contributions from two or more conductance pairs; (b) identifying at least one measured conductance in a given conductance pair whose absolute value greater than its paired conductance by a predetermined amount; (c) reconfiguring the lower-significance conductance pairs to be substantially equal corresponding to a zero joint contribution towards an overall synaptic weight, and reconfiguring one of the more-significant conductance pairs until said original synaptic weight value is obtained; and (d) inverting the polarity of the conductance-pair of lower significance for subsequent training operations.

CONCLUSION

A system and method has been shown in the above embodiments for the effective implementation of a system and method for periodically inverting the polarity of lower-significance conductance-pairs within synaptic weights for artificial neural networks constructed from signed analog conductance-pairs of varying significance. While various preferred embodiments have been shown and described, it will be understood that there is no intent to limit the invention by such disclosure, but rather, it is intended to cover all modifications falling within the spirit and scope of the invention, as defined in the appended claims.

The invention claimed is:

1. A method to mitigate undesired contributions to weight induced by fixed device asymmetry in an artificial neural network (ANN), a synaptic weight of each synapse in the ANN being represented by a weighted current flow from multiple conductance-pairs, where a plurality of training examples are serially input to the ANN while observing its output, the method comprising:

during a first transfer interval representing a first training cycle, transferring a portion of the synaptic weight from a conductance-pair of lower significance, $(g-g^{shared})$, to a conductance-pair of higher significance, $(G^+-G^-)$; and during a second transfer interval after the first transfer interval and representing a second training cycle, transferring a portion of the synaptic weight from the conductance-pair of lower significance that is inverted in polarity, $-(g-g^{shared})$, to a conductance-pair of higher significance, $(G^+-G^-)$, wherein fixed device asymmetry in this ANN cancels out across a plurality of such first and second transfer intervals.

2. The method of claim 1, wherein neurons in the ANN are implemented with CMOS circuitry.

3. The method of claim 1, wherein the synaptic weight of each synapse is implemented using an analog memory element.

4. The method of claim 3, wherein the analog memory element is a non-volatile memory (NVM).

5. The method of claim 4, wherein the NVM is selected from the group consisting of: phase-change memory, resistive random access memory, and conducting bridge random access memory.

* * * * *